(12) United States Patent
Nevins (10) Patent No.: US 7,650,721 B2
(45) Date of Patent: Jan. 26, 2010

(54) WINDOW FOR ABSORBING SUNLIGHT HEAT IN WARM WEATHER THAT OTHERWISE WOULD FLOW UNCONTROLLED THERETHROUGH AND DISCHARGING THE SUNLIGHT HEAT TO THE ATMOSPHERE WHILE PERMITTING RELATIVELY UNOBSTRUCTED VISION THERETHROUGH AND PASSING THE SUNLIGHT HEAT IN COLD WEATHER THERETHROUGH FOR THERMAL WARMING

(76) Inventor: Robert L. Nevins, Box 5 Route 28A, Boiceville, NY (US) 12412

( * ) Notice: Subject to any disclaimer, the term of this patent is extended or adjusted under 35 U.S.C. 154(b) by 301 days.

(21) Appl. No.: 11/811,812

(22) Filed: Jun. 12, 2007

(65) Prior Publication Data
US 2007/0289231 A1    Dec. 20, 2007

Related U.S. Application Data

(60) Provisional application No. 60/814,039, filed on Jun. 16, 2006.

(51) Int. Cl.
*E04D 13/18* (2006.01)
(52) U.S. Cl. .............. 52/173.3; 52/786.11; 160/31; 160/127; 126/569; 126/571; 126/617
(58) Field of Classification Search ............. 52/173.3, 52/786.11, 786.1; 126/569, 571, 617, 626, 126/628, 646, 714; 160/31, 127
See application file for complete search history.

(56) References Cited

U.S. PATENT DOCUMENTS

| 3,990,635 | A | * | 11/1976 | Restle et al. ............... 126/591 |
|---|---|---|---|---|
| 4,296,734 | A | * | 10/1981 | Nevins ....................... 126/628 |
| 4,421,098 | A | * | 12/1983 | Meta .......................... 126/604 |
| 4,577,619 | A | * | 3/1986 | Howe, Jr. ..................... 126/629 |
| 4,813,198 | A | * | 3/1989 | Johnston et al. ............ 52/171.3 |
| 4,963,206 | A | * | 10/1990 | Shacklette et al. ............. 156/99 |
| 5,164,856 | A | * | 11/1992 | Zhang et al. ................. 359/489 |
| 6,094,306 | A | * | 7/2000 | Jain ........................... 359/568 |
| 6,666,251 | B2 | * | 12/2003 | Ikle ........................... 160/120 |
| 7,093,643 | B2 | * | 8/2006 | Ikle ........................... 160/120 |
| 2003/0000171 | A1 | * | 1/2003 | Schwarz ..................... 52/786.1 |
| 2004/0123960 | A1 | * | 7/2004 | Jorgensen et al. ........... 160/310 |
| 2006/0042766 | A1 | * | 3/2006 | Jorgensen et al. ........... 160/310 |

* cited by examiner

*Primary Examiner*—Richard E Chilcot, Jr.
*Assistant Examiner*—Joshua Ihezie
(74) *Attorney, Agent, or Firm*—Charles E. Baxley (57) ABSTRACT

A window for absorbing sunlight heat in warm weather that otherwise would flow uncontrolled therethrough and discharging the sunlight heat to the atmosphere while permitting relatively unobstructed vision therethrough and passing the sunlight heat in cold weather therethrough for thermal warming. The window includes a frame, an inner pane, an outer pane, and a heat sink. The inner pane is pivotally mounted to the frame. The outer pane is affixed to the frame and spaced from the inner pane so as to form a space therebetween. The heat sink is rotatably mounted to the frame and has an extended position in which the heat sink occupies coextensively the space for absorbing the sunlight heat in the warm weather that otherwise would flow uncontrolled therethrough and discharging the sunlight heat to the atmosphere while permitting relatively unobstructed vision therethrough, and a retracted position in which the heat sink does not occupy coextensively the space for passing the sunlight heat in the cold weather therethrough for thermal warming.

33 Claims, 5 Drawing Sheets

FIG. 5

WINDOW FOR ABSORBING SUNLIGHT HEAT IN WARM WEATHER THAT OTHERWISE WOULD FLOW UNCONTROLLED THERETHROUGH AND DISCHARGING THE SUNLIGHT HEAT TO THE ATMOSPHERE WHILE PERMITTING RELATIVELY UNOBSTRUCTED VISION THERETHROUGH AND PASSING THE SUNLIGHT HEAT IN COLD WEATHER THERETHROUGH FOR THERMAL WARMING

1. CROSS REFERENCE TO RELATED APPLICATIONS

The instant non provisional patent application claims priority from provisional patent application No. 60/814,039, filed on Jun. 16, 2006, entitled SOLAR ENERGY CONVERSION WINDOW, and incorporated herein by reference thereto.

2. BACKGROUND OF THE INVENTION

A. Field of the Invention

The embodiments of the present invention relate to a window, and more particularly, the embodiments of the present invention relate to a window for absorbing sunlight heat in warm weather that otherwise would flow uncontrolled therethrough and discharging the sunlight heat to the atmosphere while permitting relatively unobstructed vision therethrough and passing the sunlight heat in cold weather therethrough for thermal warming.

B. Description of the Prior Art

Window, door lights, and similar transparent structures probably represent the single greatest source of heat loss in cold weather and heat gain in warm weather in most buildings. Recognition of this fact has led to a number of widely accepted developments of which the passive "storm" window and the "thermal pane" insulating window are typical.

Although these devices are often quite effective in attenuating heat flow, nevertheless they fail to achieve truly optimum performance because they act only as heat barriers. Thus, these structures fail to provide some way to manipulate or take full advantage of the radiant solar heat energy that is incident upon the window or door light in question.

As heating and air conditioning costs increase, and as the fuels that are needed to provide this heating and air conditioning become more scarce, there is an unquestionable need to improve conservation and heat utilization technology.

Numerous innovations for windows and window-related devices have been provided in the prior art that will be described below, which are in chronological order to show advancement in the art, and which are incorporated herein by reference thereto. Even though these innovations may be suitable for the specific individual purposes to which they address, they each differ in structure, and/or operation, and/or purpose, from the embodiments of the present invention in that they do not teach a window for absorbing sunlight heat in warm weather that otherwise would flow uncontrolled therethrough and discharging the sunlight heat to the atmosphere while permitting relatively unobstructed vision therethrough and passing the sunlight heat in cold weather therethrough for thermal warming.

(1) U.S. Pat. No. 4,296,734 to Nevins.

U.S. Pat. No. 4,296,734 issued to Nevins on Oct. 27, 1981 in class 126 and subclass 431 teaches a heat sink in the form of a mesh interposed between two spaced panes in a window or door light. A combination of holes and passageways formed in the window sash frame members permit the selective establishment of convective air currents past the mesh to absorb the solar converted thermal heat stored in the sink. By manipulating the source of the air for these convective currents, i.e., from the inside or the outside of a building, and by choosing the volume into which the warmed air currents are to be discharged, i.e., inside or outside the building, significant heating and cooling efficiencies are achieved.

(2) U.S. Pat. No. 4,365,620 to Bliamptis.

U.S. Pat. No. 4,365,620 issued to Bliamptis on Dec. 28, 1982 in class 126 and subclass 429 teaches a reversible, variably inclinable window with controlled convection for mounting in a window casing in a building for solar heating and cooling, including a window frame having top and bottom portions and being adapted to pivot about a horizontal axis intermediate the portions, a first window panel mounted in the frame capable of transmitting both visible and infrared radiation, a second window panel mounted in the frame and substantially parallel and in a spaced relationship to the first window panel and being capable of transmitting visible radiation and blocking infrared radiation, and openings proximate to the top and bottom portions for providing air passageways to space between the first and second window panels so that rotation of the assembly about its horizontal axis can place either of the panels toward the outside of the building for selective reflection or absorption of the radiant energy to enable heating or cooling of the interior space between the panels in order to utilize the properties of the air caused to pass therethrough. Sealing apparatus at the sides of the window casing is for sealing against the window frame while allowing for optimization of the inclination angle of the window with respect to radiant energy impinging thereon.

(3) U.S. Pat. No. 4,382,436 to Hager.

U.S. Pat. No. 4,382,436 issued to Hager on May 10, 1983 in class 126 and subclass 429 teaches that the solar gain through a window assembly is maximized in cold weather, and minimized in warm weather. The window includes first and second transparent sheets with an open volume between the sheets. A selective light-reflecting device is disposed in the open volume allowing passage of light from one sheet to the other in cold weather, but preventing passage in warm weather. A vent in a first frame, mounting the first sheet, selectively allows the passage of air from the exterior of a building containing the window assembly to the volume between the reflecting device and the first sheet. The air is circulated and then passed back to the exterior of the building. Another vent in a second frame mounting the second sheet allows circulation of air from the interior of the building to between the transparent sheets and back to the building interior.

(4) U.S. Pat. No. 4,577,619 to Howe Jr.

U.S. Pat. No. 4,577,619 issued to Howe Jr. on Mar. 25, 1986 in class 126 and subclass 431 teaches energy efficient window and skylight assemblies having self-contained ventilating systems. Two sheets of a transparent or translucent material are spaced-apart in parallel relationship so as to form an air flow channel between the sheets. An adjustable shade is positioned in the air flow channel to regulate the amount of sunlight passing through the window and skylight assemblies. A fan in the top or bottom of the assembly causes air to be drawn into the assembly and passed through the air flow channel where it absorbs heat from the shade and sides of the assembly. This air is then directed into the building to provide heat or is vented to the outside to decrease the heat gain in the building.

(5) U.S. Pat. No. 5,063,984 to Cherveny.

U.S. Pat. No. 5,063,984 issued to Cherveny on Nov. 12, 1991 in class 160 and subclass 7 teaches a solar heating device indicating the proper window covering status for maximum energy conservation. A support structure rests on the window sill, and suspends two thermistors. One thermistor is supported on the room side of drapery and the other thermistor is supported between the drapery and a window. When the net heat flow is inward from outside the room, the thermistor near the window will be warmer than the room side thermistor. When this occurs, the temperature-dependent resistances of thermistors, voltage divider resistances, and a comparator turn on a light-emitting diode. This indicates that the drapery should be opened to let solar radiation in to heat the room. Otherwise, the drapery should be closed to conserve the existing heat in the room.

(6) U.S. Pat. No. 5,090,302 to Eisenbeisz.

U.S. Pat. No. 5,090,302 issued to Eisenbeisz on Feb. 25, 1992 in class 454 and subclass 205 teaches a window for reducing heat gain or loss through windows by ventilating interior air at interior temperatures over the exterior of the window in a controlled circulation pattern using nozzle tubes with a plurality of transversely disposed air jet apertures mounted in the jambs and mullions. Interior air is ventilated by a fan or compressor into air supply tubing that is attached to the nozzle tubes. Preferably, the amount of air ventilated is less than or equal to the minimum amount of ventilation required under ventilation standards.

(7) United States Patent Application Publication Number 2003/0168056 to Fidler.

United States Patent Application Publication Number 2003/0168056 published to Fidler on Sep. 11, 2003 in class 126 and subclass 628 teaches a Venetian-blind-type solar heater. The top outer half of the slats are coated with a heat-absorbing material while the rest of the slats are coated with a non-heat-absorbing material. Thermal conduction in the metal slats heats the entire slat. The distance between the slats are half the width of the slat so that the slats overlap. The number of slats increases thereby increasing the total surface area available for heat transfer to the inside room air by convection and thermal radiation. When the orientation of the slats are reversed, the heat-absorbing surface area is shielded from outside solar radiation and any stray inside room radiation.

(8) United States Patent Application Publication Number 2005/0056272 to Durbin.

United States Patent Application Publication Number 2005/0056272 published to Durbin on Mar. 17, 2005 in class 126 and subclass 628 teaches a portable solar heater for use with a window of an enclosed space of a building structure or vehicle. The portable solar heater includes a sheet metal body and a releasable support to mount the sheet metal body relative to an interior surface of the window. The sheet metal body includes a pair of oppositely facing surfaces separated by a thickness "t" of the sheet metal. One of the surfaces is a window-facing surface and is a highly solar-energy-absorptive surface.

It is apparent that numerous innovations for windows and window-related devices have been provided in the prior art that are adapted to be used. Furthermore, even though these innovations may be suitable for the specific individual purposes to which they address, they would not be suitable for the purposes of the embodiments of the present invention as heretofore described, namely, a window for absorbing sunlight heat in warm weather that otherwise would flow uncontrolled therethrough and discharging the sunlight heat to the atmosphere while permitting relatively unobstructed vision therethrough and passing the sunlight heat in cold weather therethrough for thermal warming.

3. SUMMARY OF THE INVENTION

Thus, an object of the embodiments of the present invention is to provide a window for absorbing sunlight heat in warm weather that otherwise would flow uncontrolled therethrough and discharging the sunlight heat to the atmosphere while permitting relatively unobstructed vision therethrough and passing the sunlight heat in cold weather therethrough for thermal warming, which avoids the disadvantages of the prior art.

Briefly stated, another object of the embodiments of the present invention is to provide a window for absorbing sunlight heat in warm weather that otherwise would flow uncontrolled therethrough and discharging the sunlight heat to the atmosphere while permitting relatively unobstructed vision therethrough and passing the sunlight heat in cold weather therethrough for thermal warming. The window includes a frame, an inner pane, an outer pane, and a heat sink. The inner pane is pivotally mounted to the frame. The outer pane is affixed to the frame and spaced from the inner pane so as to form a space therebetween. The heat sink is rotatably mounted to the frame and has an extended position in which the heat sink occupies coextensively the space for absorbing the sunlight heat in the warm weather that otherwise would flow uncontrolled therethrough and discharging the sunlight heat to the atmosphere while permitting relatively unobstructed vision therethrough, and a retracted position in which the heat sink does not occupy coextensively the space for passing the sunlight heat in the cold weather therethrough for thermal warming.

The novel features considered characteristic of the embodiments of the present invention are set forth in the appended claims. The embodiments of the present invention themselves, however, both as to their construction and their method of operation together with additional objects and advantages thereof will be best understood from the following description of the specific embodiments when read and understood in connection with the accompanying drawing.

4. BRIEF DESCRIPTION OF THE DRAWING

The figures of the drawing are briefly described as follows.

5. LIST OF REFERENCE NUMERALS UTILIZED IN THE DRAWING

A. General 10 window of embodiments of present invention for absorbing sunlight heat 12 in warm weather that otherwise would flow uncontrolled therethrough and discharging sunlight heat 12 to atmosphere 13 while permitting relatively unobstructed vision therethrough and passing sunlight heat 12 in cold weather therethrough for thermal warming
12 sunlight heat
13 atmosphere

B. The Overall Configuration 14 frame
16 inner pane
18 outer pane
20 heat sink for absorbing sunlight heat 12 in warm weather that otherwise would flow uncontrolled therethrough and discharging sunlight heat 12 to atmosphere 13 while permitting relatively unobstructed vision therethrough and for passing sunlight heat 12 in cold weather therethrough for thermal warming
22 space
24 frame of inner pane 16
26 single lite of inner panel 16.
28 hinges of inner pane 16
29 pair of jambs of frame 14
30 upper cross member of frame 14
32 lower cross member of frame 14
34 spring-loaded roller of heat sink 20
36 solar-energy conversion screen of heat sink 20
38 fixed end of solar-energy conversion screen 36 of heat sink 20
40 depending free end of solar-energy conversion screen 36 of heat sink 20
42 hem bar at depending free end 40 of solar-energy conversion screen 36 of heat sink 20
43 vertical hem bar grooves in inner stiles 44, respectively
44 inner stiles
46 head jamb of frame 14
48 foot jamb of frame 14
50 upper telescoping air-tight vent for controlling air flow relative to window 10
52 lower telescoping air-tight vent for controlling air flow relative to window 10
54 door of upper telescoping air-tight vent 50
56 door of lower telescoping air-tight vent 52
58 vent cover of upper telescoping air-tight vent 50
60 vent cover of lower telescoping air-tight vent 52
62 heat-pump hot-water heater

C. Specific Configuration of Valve 63 of Upper Telescoping Air-Tight Vent 50

63 valve of upper telescoping air-tight vent 50 for determining atmospheric flow direction
64 valve of lower telescoping air-tight vent 52 for determining atmospheric flow direction
66 outer tube of valve 63 of upper telescoping air-tight vent 50
68 inner tube of valve 63 of upper telescoping air-tight vent 50
70 bore in outer tube 66 of valve 63 of upper telescoping air-tight vent 50
71 bore in inner tube 68 of valve 63 of upper telescoping air-tight vent 50
72 bottom of outer tube 66 of valve 63 of upper telescoping air-tight vent 50
73 closed working end of inner tube 68 of valve 63 of upper telescoping air-tight vent 50
74 insulation of inner tube 68 of valve 63 of upper telescoping air-tight vent 50
76 knob of closed working end 73 of inner tube 68 of valve 63 of upper telescoping air-tight vent 50

6. DETAILED DESCRIPTION OF THE PREFERRED EMBODIMENTS

A. General

Figure 1:
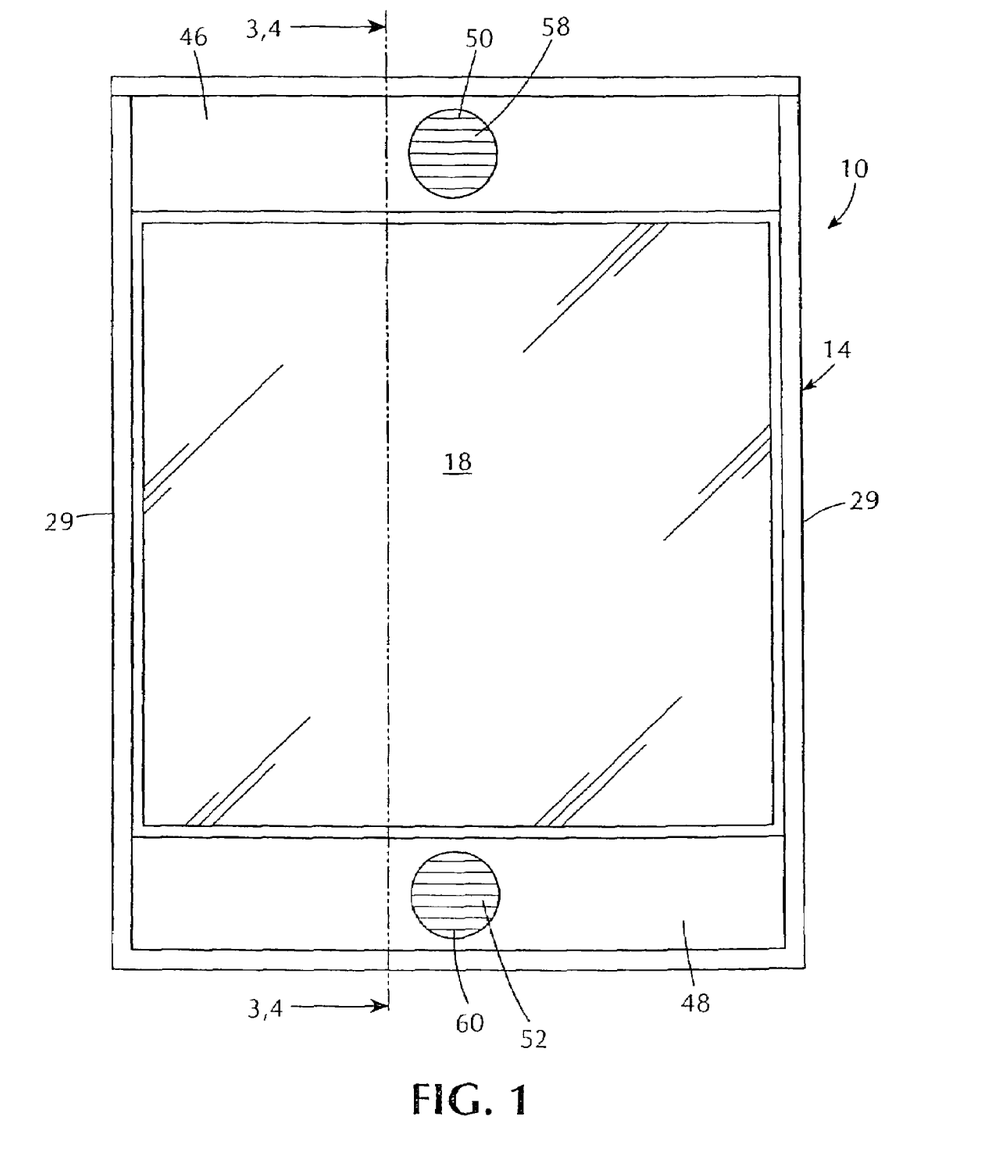
FIG. 1 is a diagrammatic exterior elevational view of the window of the embodiments of the present invention absorbing sunlight heat in warm weather that otherwise would flow uncontrolled therethrough and discharging the sunlight heat to the atmosphere while permitting relatively unobstructed vision therethrough and passing the sunlight heat in cold weather therethrough for thermal warming.
Figure 2:
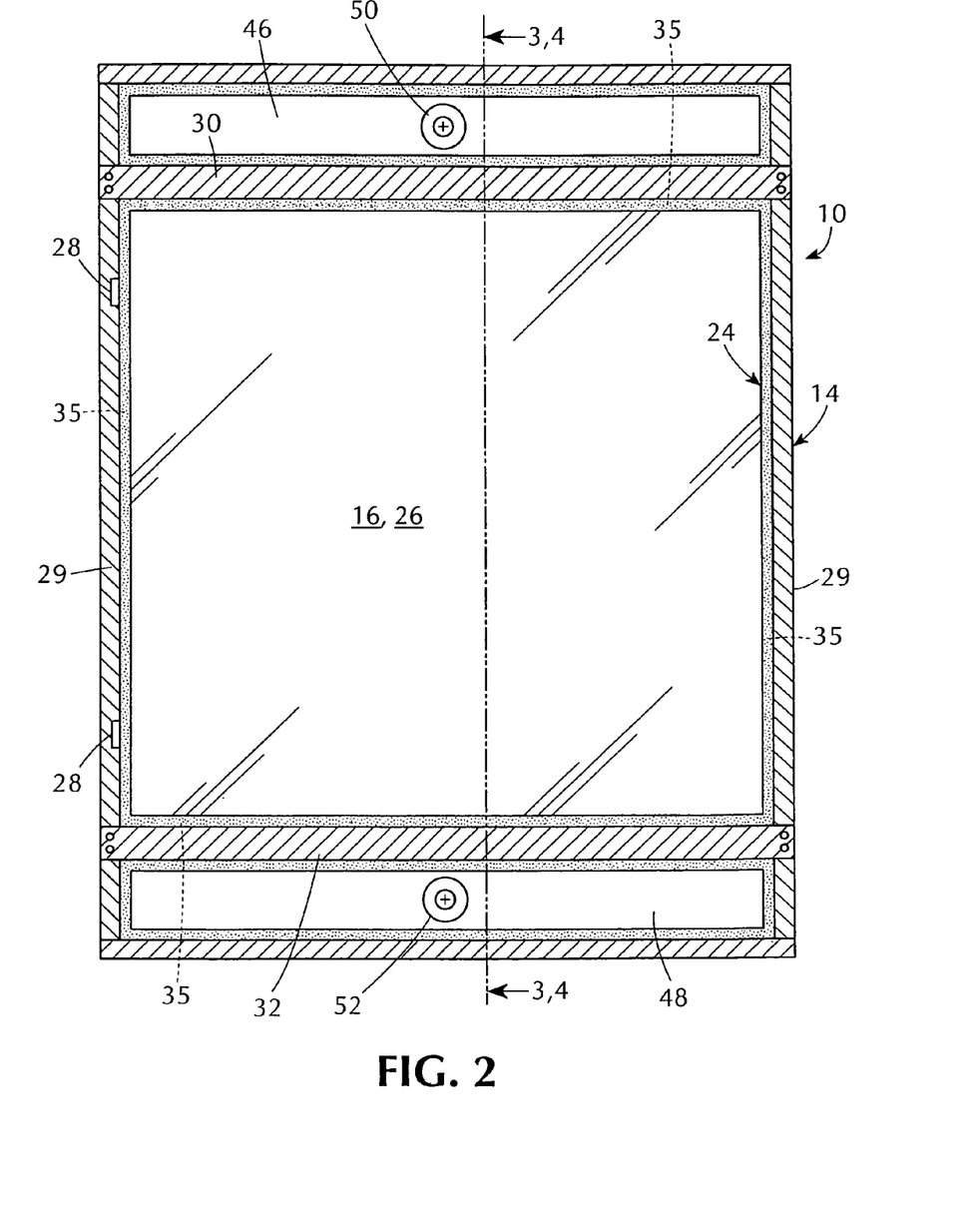
FIG. 2 is a diagrammatic interior elevational view of the window of the embodiments of the present invention absorbing sunlight heat in warm weather that otherwise would flow uncontrolled therethrough and discharging the sunlight heat to the atmosphere while permitting relatively unobstructed vision therethrough and passing the sunlight heat in cold weather therethrough for thermal warming.
Figure 3:
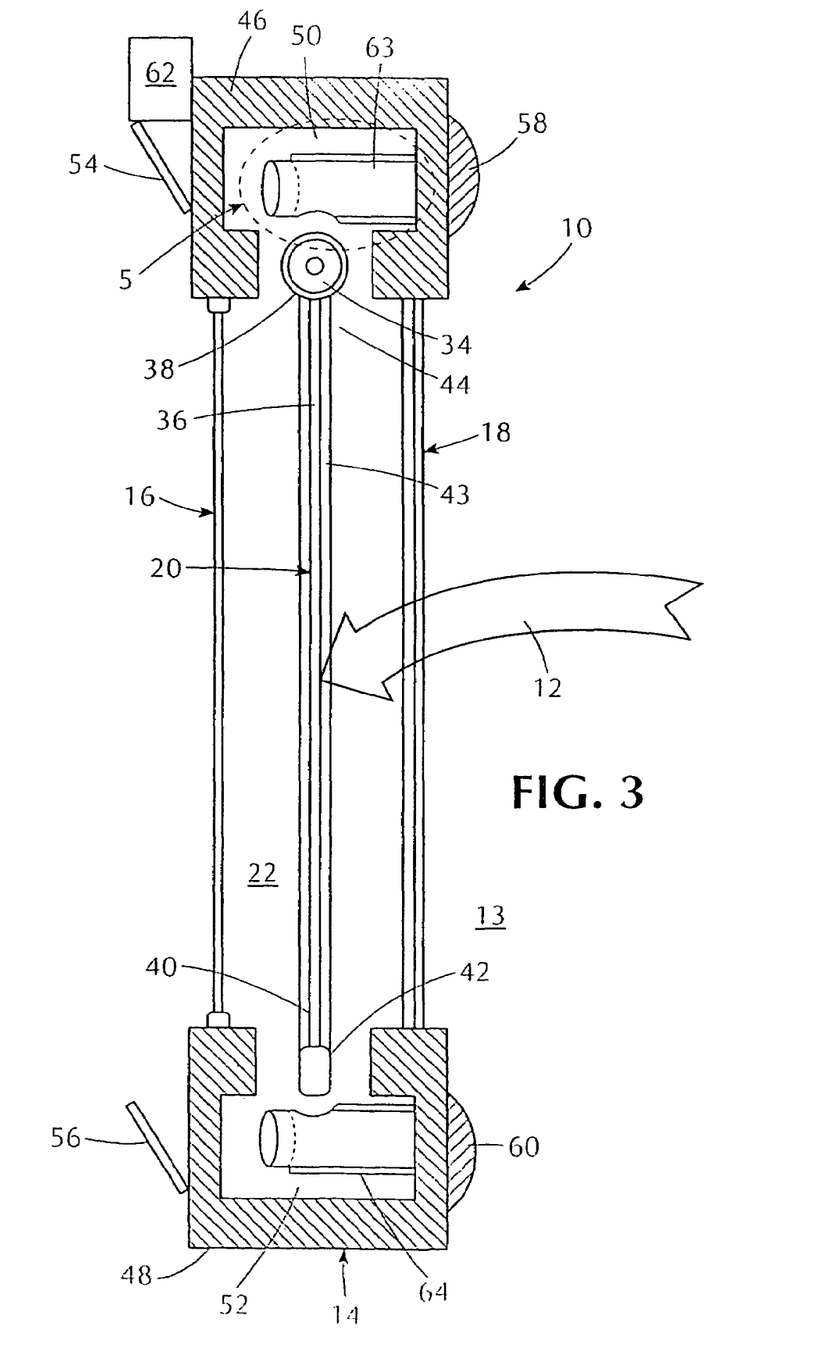
FIG. 3 is a diagrammatic cross sectional view taken along LINES 3-3 in FIGS. 1 and 2 of the window of the embodiments of the present invention in the warm weather mode.
Figure 4:
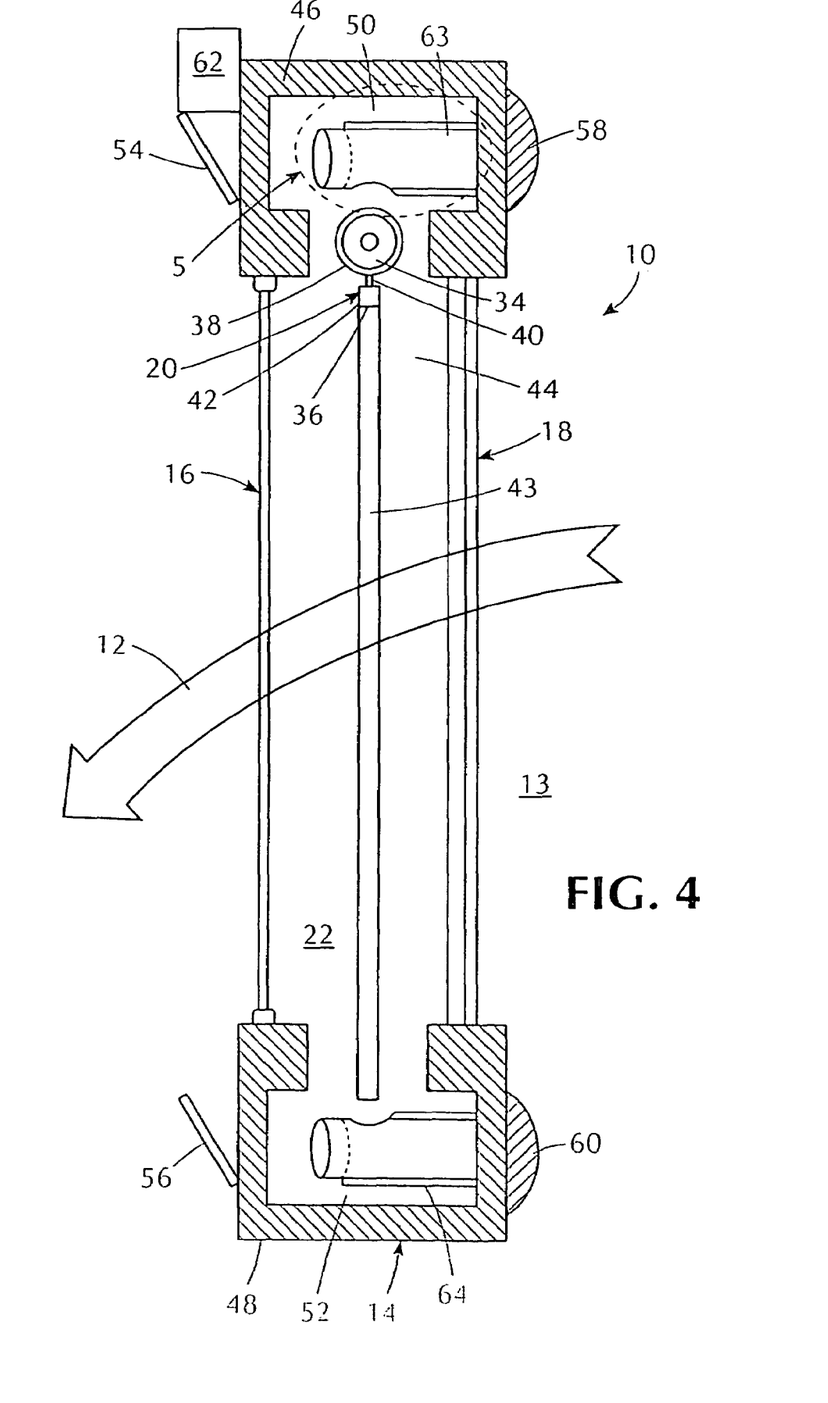
FIG. 4 is a diagrammatic cross sectional view taken along LINES 4-4 in FIGS. 1 and 2 of the window of the embodiments of the present invention in the cold weather mode.

Referring now to the figures, in which like numerals indicate like parts, and particularly to FIGS. 1-4, which are, respectively, a diagrammatic exterior elevational view of the window of the embodiments of the present invention absorbing sunlight heat in warm weather that otherwise would flow uncontrolled therethrough and discharging the sunlight heat to the atmosphere while permitting relatively unobstructed vision therethrough and passing the sunlight heat in cold weather therethrough for thermal warming, a diagrammatic interior elevational view of the window of the embodiments of the present invention absorbing sunlight heat in warm weather that otherwise would flow uncontrolled therethrough and discharging the sunlight heat to the atmosphere while permitting relatively unobstructed vision therethrough and passing the sunlight heat in cold weather therethrough for thermal warming, a diagrammatic cross sectional view taken along LINES 3-3 in FIGS. 1 and 2 of the window of the embodiments of the present invention in the warm weather mode, and a diagrammatic cross sectional view taken along LINES 4-4 in FIGS. 1 and 2 of the window of the embodiments of the present invention in the cold weather mode, the window of the embodiments of the present invention is shown generally at 10 for absorbing sunlight heat 12 in warm weather that otherwise would flow uncontrolled therethrough and discharging the sunlight heat 12 to the atmosphere 13 while permitting relatively unobstructed vision therethrough (FIG. 3) and passing the sunlight heat 12 in cold weather therethrough for thermal warming (FIG. 4).

B. The Overall Configuration

As shown in FIGS. 1-4, the window comprises a frame 14, an inner pane 16, an outer pane 18, and a heat sink 20. The inner pane 16 is pivotally mounted to the frame 14. The outer pane 18 is affixed to the frame 14 and spaced from the inner pane 16 so as to form a space 22 therebetween. The heat sink 20 is rotatably mounted to the frame 14 and has an extended position in which the heat sink 20 occupies coextensively the space 22 for absorbing the sunlight heat 12 in the warm weather that otherwise would flow uncontrolled therethrough and discharging the sunlight heat 12 to the atmosphere 13 while permitting relatively unobstructed vision therethrough (FIG. 3), and a retracted position in which the heat sink 20 does not occupy coextensively the space 22 for passing the sunlight heat 12 in the cold weather therethrough for thermal warming (FIG. 4).

The heat sink 20 is accessed to convert between the extended position thereof and the retracted position thereof by pivotally opening the inner pane 16.

The frame 14 is made of a material selected from the group consisting of wood, vinyl, metal, and combinations thereof.

As shown in FIG. 2, the inner pane 16 comprises a frame 24 and a single lite 26. The frame 24 of the inner panel 16 is hingedly attached to the frame 14 by hinges 28. The single lite 26 of the inner pane 16 is contained within the frame 24 of the inner pane 16.

As shown in FIG. 2, the frame 14 has a pair of side jambs 29, an upper cross member 30 extending horizontally across the pair of side jambs 29 of the frame 14 and a lower cross member 32 extending horizontally across the pair of side jambs 29. The pair of side jambs 29 of the frame 14, the upper cross member 30 of the frame 14, and the lower cross member 32 of the frame 14 accommodate the frame 24 of the inner panel 16, and contain rabbets 35 to facilitate the accommodation.

The single lite 26 of the inner pane 16 is made of a transparent material selected from the group consisting of plastic and glass. The frame 24 of the inner panel 16 is made of metal.

The outer pane 18 is double glazed.

As shown in FIGS. 3 and 4, the heat sink 20 comprises a spring-loaded roller 34 and a solar-energy conversion screen 36. The spring-loaded roller 34 of the heat sink 20 sits in the space 22 and is attached to the pair of side jambs 29 of the frame 14. The solar-energy conversion screen 36 of the heat sink 20 has a fixed end 38 thereof attached to the spring-loaded roller 34 of the heat sink 20, rolls therearound, and terminates in a depending free end 40 thereof selectively extending through the space 22.

As shown in FIGS. 3 and 4, the depending free end 40 of the solar-energy conversion screen 36 of the heat sink 20 has a hem bar 42 thereat facilitating rolling and unrolling the solar-energy conversion screen 36 of the heat sink 20. The hem bar 42 on the depending free end 40 of the solar-energy conversion screen 36 of the heat sink 20 runs in vertical hem grooves 43 in inner stiles 44, respectively, between the outer panel 18 and the inner panel 16. The vertical hem grooves 43 in inner stiles 44, respectively, function as shade guides and to prevent any sunlight heat 12 from getting around sides of the solar-energy conversion screen 36 of the heat sink 20.

The solar-energy conversion screen 36 of the heat sink 20 is made of a thin, pliable, dark fiberglass fabric mesh, and is interchangeable with a foiled-faced heat-reflecting shade or an insulated shade for enhancing the R value of the window 10.

It has been shown that the solar-energy conversion screen 36 of the heat sink 20 when in the extended position thereof converts 90% of the sunlight heat 12 incident thereupon to thermal heat.

As shown in FIGS. 1-4, the frame 14 further has a head jamb 46 and a foot jamb 48. The window 10 further comprises an upper telescoping air-tight vent 50 and a lower telescoping air-tight vent 52. The upper telescoping air-tight vent 50 is disposed through the head jamb 46 of the frame 14 and is for controlling and directing air flow relative to the window 10. The lower telescoping air-tight vent 52 is disposed through the foot jamb 48 of the frame 14 and is for controlling and directing air flow relative to the window 10.

As shown in FIG. 3, the upper telescoping air-tight vent 50 and the lower telescoping air-tight vent 52, through appropriate opening and closing thereof, establish convective air currents for absorbing the sunlight heat 12 in the warm weather that otherwise would flow uncontrolled therethrough and discharging the sunlight heat 12 to the atmosphere 13 while permitting relatively unobstructed vision therethrough.

The upper telescoping air-tight vent 50 and the lower telescoping air-tight vent 52 are made of weather-proof plastic.

As shown in FIGS. 3 and 4, the upper telescoping air-tight vent 50 comprises a door 54. The door 54 of the upper telescoping air-tight vent 50 is hingedly attached to and extends across the head jamb 46 of the frame 14 above the inner pane 16. The lower telescoping air-tight vent 52 comprises a door 56. The door 56 of the lower telescoping air-tight vent 52 is hingedly attached to and extends across the foot jamb 48 of the frame 14 below the inner pane 16.

As shown in FIGS. 1, 3, and 4, the upper telescoping air-tight vent 50 further comprises a vent cover 58. The vent cover 58 of the upper telescoping air-tight vent 50 is attached to the head jamb 46 of the frame 14 above the outer pane 18. The lower telescoping air-tight vent 52 further comprises a vent cover 60. The vent cover 60 of the lower telescoping air-tight vent 52 is attached to the foot jamb 48 of the frame 14 below the outer pane 18.

As shown in FIG. 3, the window 10 further comprises a heat-pump hot-water heater 62. The heat-pump hot-water heater 62 is disposed above the door 54 of the upper telescoping air-tight vent 50. The sunlight heat 12 exiting the door 54 of the upper telescoping air-tight vent 50 is ingested by the heat-pump hot-water heater 62 and thereby converted to hot water heating to thereby reduce hot water heating costs by 75%, and provide free cooling and dehumidification as a byproduct thereof to thereby further reduce energy costs and fossil fuel use.

As shown in FIGS. 3 and 4, the upper telescoping air-tight vent 50 further comprises a valve 63. The valve 63 of the upper telescoping air-tight vent 50 selectively communicates the vent cover 58 of the upper telescoping air-tight vent 50 with either the space 22 or the door 54 of the upper telescoping air-tight vent 50 for determining atmospheric flow direction. The lower telescoping air-tight vent 52 further comprises a valve 64. The valve 64 of the lower telescoping air-tight vent 52 selectively communicates the vent cover 60 of the lower telescoping air-tight vent 52 with either the space 22 or the door 56 of the lower telescoping air-tight vent 52 for determining atmospheric flow direction.

C. The Specific Configuration of the Valve 63 of the Upper Telescoping Air-Tight Vent 50

Since the valve 64 of the telescoping air-tight vent 52 is a mirror image of the valve 63 of the upper telescoping air-tight vent 50, for the sake of brevity only the valve 63 of the upper telescoping air-tight vent 50 will be discussed.

Figure 5:
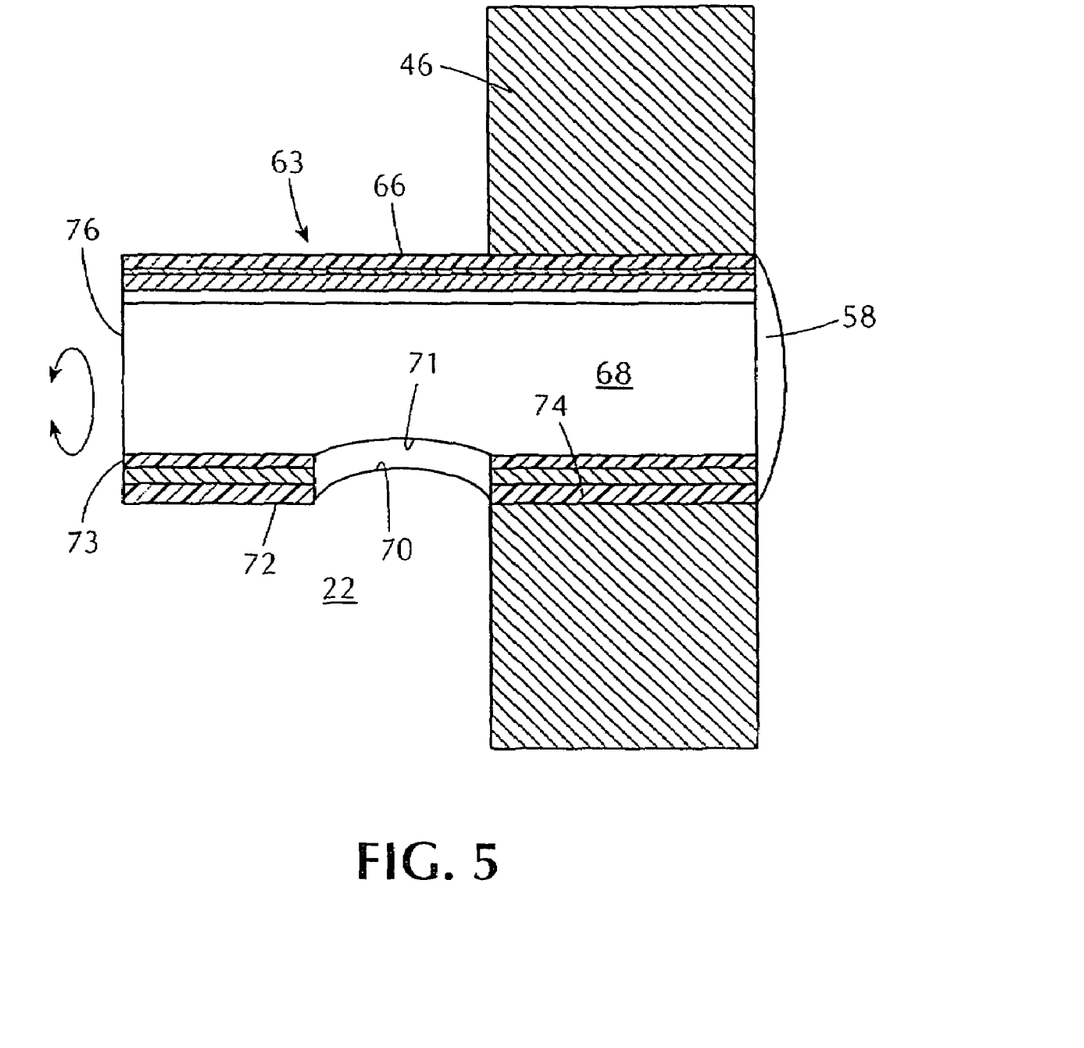
FIG. 5 is an enlarged diagrammatic cross sectional view of the area generally enclosed by the dotted curve identified by ARROW 5 in FIGS. 3 and 4 of the valve of the upper telescoping air-tight vent of the window of the embodiments of the present invention.

The configuration of the valve 63 of the upper telescoping air-tight vent 50 can best be seen in FIG. 5, which is an enlarged diagrammatic cross sectional view of the area generally enclosed by the dotted curve identified by ARROW 5 in FIGS. 3 and 4 of the valve of the upper telescoping air-tight vent of the window of the embodiments of the present invention, and as such, will be discussed with reference thereto.

The valve 63 of the upper telescoping air-tight vent 50 comprises an outer tube 66 and an inner tube 68. The outer tube 66 of the valve 63 of the upper telescoping air-tight vent 50 extends inwardly into the head jamb 46 of the frame 14 communicatingly from the vent cover 58 to the space 22.

The outer tube 66 of the valve 63 of the upper telescoping air-tight vent 50 and the inner tube 68 of the valve 63 of the upper telescoping air-tight vent 50 are made of plastic.

The outer tube 66 of the valve 63 of the upper telescoping air-tight vent 50 has a bore 70 therein. The bore 70 in the outer tube 66 of the valve 63 of the upper telescoping air-tight vent 50 is at a bottom 72 of the outer tube 66 of the valve 63 of the upper telescoping air-tight vent 50, and selectively communicates the outer tube 66 of the valve 63 of the upper telescoping air-tight vent 50 with the space 22.

The inner tube 68 of the valve 63 of the upper telescoping air-tight vent 50 extends telescopingly slidably into the outer tube 66 of the valve 63 of the upper telescoping air-tight vent 50, and has a bore 71 matching the bore 70 in the outer tube 66 of the valve 63 of the upper telescoping air-tight vent 50.

The inner tube 68 of the valve 63 of the upper telescoping air-tight vent 50 further has a closed working end 73, and is covered with insulation 74. The closed working end 73 of the inner tube 68 of the valve 63 of the upper telescoping air-tight vent 50 has a knob 76 attached thereto so by simply turning the knob 76 on the closed working end 73 of the inner tube 68 of the valve 63 of the upper telescoping air-tight vent 50 a ½ turn, the bore 71 in the inner tube 68 of the valve 63 of the upper telescoping air-tight vent 50 becomes misaligned with the bore 70 in the outer tube 66 of the valve 63 of the upper telescoping air-tight vent 50 thereby shutting off air flow through the upper telescoping air-tight vent 50.

In winter, the inner tube 68 of the valve 63 of the upper telescoping air-tight vent 50 is slidably removed from the outer tube 66 of the valve 63 of the upper telescoping air-tight vent 50 and reinserted with the closed working end 73 of the inner tube 68 of the valve 63 of the upper telescoping air-tight vent 50 first to thereby seal the upper telescoping air-tight vent 50.

D. The Conclusions

It will be understood that each of the elements described above or two or more together may also find a useful application in other types of constructions differing from the types described above.

While the embodiments of the present invention have been illustrated and described as embodied in a window for absorbing sunlight heat in warm weather that otherwise would flow uncontrolled therethrough and discharging the sunlight heat to the atmosphere while permitting relatively unobstructed vision therethrough and passing the sunlight heat in cold weather therethrough for thermal warming, however, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis the foregoing will so fully reveal the gist of the embodiments of the present invention that others can by applying current knowledge readily adapt them for various applications without omitting features that from the standpoint of prior art fairly constitute characteristics of the generic or specific aspects of the embodiments of the present invention.

The invention claimed is:

1. A window for absorbing sunlight heat in warm weather that otherwise would flow uncontrolled therethrough and discharging the sunlight heat to the atmosphere while permitting relatively unobstructed vision therethrough and passing the sunlight heat in cold weather therethrough for thermal warming, said window comprising:
   a) a frame;
   b) an inner pane;
   c) an outer pane; and
   d) a heat sink;
   wherein said inner pane is pivotally mounted to said frame;
   wherein said outer pane is affixed to said frame;
   wherein said outer pane is spaced from said inner pane so as to form a space therebetween;
   wherein said heat sink is rotatably mounted to said frame;
   wherein said heat sink has an extended position in which said heat sink occupies coextensively said space for absorbing the sunlight heat in the warm weather that otherwise would flow uncontrolled therethrough and discharging the sunlight heat to the atmosphere while permitting relatively unobstructed vision therethrough;
   wherein said heat sink has a retracted position in which said heat sink does not occupy coextensively said space for passing the sunlight heat in the cold weather therethrough for thermal warming;
   wherein said heat sink comprises a solar-energy conversion screen;
   wherein said solar-energy conversion screen of said heat sink is made of a thin, pliable, dark, fiberglass fabric mesh; and
   wherein said solar-energy conversion screen of said heat sink is interchangeable with a foiled-faced heat-reflecting shade or an insulated shade for enhancing the R value of said window;
   wherein said frame has:
   a) a head jamb with an upper telescoping air-tight vent; and
   b) a foot jamb with a lower telescoping air-tight vent.

2. The window of claim 1, wherein said frame is made of a material selected from the group consisting of wood, vinyl, metal, and combinations thereof.

3. The window of claim 1, wherein said inner pane comprises:
   a) a frame; and
   b) a single lite;
   wherein said frame of said inner pane is hingedly attached to said frame; and
   wherein said single lite of said inner pane is contained within said frame of said inner pane.

4. The window of claim 3, wherein said frame of said inner pane has:
   a) a pair of side jambs;
   b) an upper cross member; and
   c) a lower cross member;
   wherein said upper cross member of said frame of said inner pane extends horizontally across said pair of side jambs of said frame of said inner pane;
   wherein said lower cross member extends horizontally across said pair of side jambs of said frame of said inner pane; and
   wherein said upper cross member of said frame of said inner pane, said lower cross member of said frame of said inner pane, and said pair of side jambs of said frame of said inner pane accommodate said frame of said inner pane.

5. The window of claim 4, wherein said upper cross member of said frame of said inner pane and said lower cross member of said frame of said inner pane are rabetted to facilitate accommodation of said frame of said inner pane.

6. The window of claim 4, wherein said heat sink comprises
   a spring-loaded roller;
   wherein said spring-loaded roller of said heat sink sits in said space;
   wherein said spring-loaded roller of said heat sink is attached to said pair of side jambs of said frame;

wherein said solar-energy conversion screen of said heat sink has a fixed end thereof attached to said spring-loaded roller of said heat sink, rolls therearound, and terminates in a depending free end thereof selectively extending through said space.

7. The window of claim 6, wherein said depending free end of said solar-energy conversion screen of said heat sink has a hem bar threat facilitating the rolling and unrolling of said solar-energy conversion screen of said heat sink.

8. The window of claim 7, wherein said hem bar on said depending free end of said solar-energy conversion screen of said heat sink runs in vertical hem grooves in inner stiles, respectively, between said outer panel and said inner panel; and wherein said vertical hem grooves in inner stiles, respectively, function as shade guides and to prevent any sunlight heat from getting around sides of said solar-energy conversion screen of said heat sink.

9. The window of claim 3, wherein said single lite of said inner pane is made of a transparent material selected from the group consisting of plastic and glass; and wherein said frame of said inner pane is made of metal.

10. The window of claim 1, wherein said outer pane is double glazed.

11. The window of claim 1, wherein said upper telescoping air-tight vent is disposed through said head jamb of said frame;

wherein said upper telescoping air-tight vent is for controlling air flow relative to said window;

wherein said upper telescoping air-tight vent is for directing the air flow relative to said window;

wherein said lower telescoping air-tight vent is disposed through said foot jamb of said frame;

wherein said lower telescoping air-tight vent is for controlling air flow relative to said window;

wherein said lower telescoping air-tight vent is for directing the air flow relative to said window; and wherein said upper telescoping air-tight vent and said lower telescoping air-tight vent, through appropriate opening and closing thereof, establish convective air currents for absorbing the sunlight heat in the warm weather that otherwise would flow uncontrolled therethrough and discharging the sunlight heat to the atmosphere while permitting relatively unobstructed vision therethrough.

12. The window of claim 11, wherein said upper telescoping air-tight vent is made of weather-proof plastic; and wherein said lower telescoping air-tight vent is made of weather-proof plastic.

13. The window of claim 11, wherein said upper telescoping air-tight vent comprises a door;

wherein said door of said upper telescoping air-tight vent is hingedly attached to said head jamb of said frame;

wherein said door of said upper telescoping air-tight vent extends across said head jamb of said frame;

wherein said door of said upper telescoping air-tight vent extends above said inner pane;

wherein said lower telescoping air-tight vent comprises a door;

wherein said door of said lower telescoping air-tight vent is hingedly attached to said foot jamb of said frame;

wherein said door of said lower telescoping air-tight vent extends across said foot jamb of said frame; and wherein said door of said lower telescoping air-tight vent extends below said inner pane.

14. The window of claim 11, wherein said upper telescoping air-tight vent comprises a vent cover;

wherein said vent cover of said upper telescoping air-tight vent is attached to said head jamb of said frame;

wherein said vent cover of said upper telescoping air-tight vent is above said outer pane;

wherein said lower telescoping air-tight vent comprises a vent cover;

wherein said vent cover of said lower telescoping air-tight vent is attached to said foot jamb of said frame; and wherein said vent cover of said lower telescoping air-tight vent is below said outer pane.

15. The window of claim 14, wherein said upper telescoping air-tight vent comprises a valve; and wherein said valve of said upper telescoping air-tight vent selectively communicates said vent cover of said upper telescoping air-tight vent with either said space or said door of said upper telescoping air-tight vent for determining atmospheric flow direction.

16. The window of claim 15, wherein said valve of said upper telescoping air-tight vent comprises:

a) an outer tube; and
b) an inner tube.

17. The window of claim 16, wherein said outer tube of said valve of said upper telescoping air-tight vent extends inwardly into said head jamb of said frame communicatingly from said vent cover of said upper telescoping air-tight vent to said space.

18. The window of claim 16, wherein said outer tube of said valve of said upper telescoping air-tight vent and said inner tube of said valve of said upper telescoping air-tight vent are made of plastic.

19. The window of claim 16, wherein said outer tube of said valve of said upper telescoping air-tight vent has a bore therein;

wherein said bore in said outer tube of said valve of said upper telescoping air-tight vent is at a bottom of said outer tube of said valve of said upper telescoping air-tight vent; and wherein said bore in said outer tube of said valve of said upper telescoping air-tight vent selectively communicates said outer tube of said valve of said upper telescoping air-tight vent with said space.

20. The window of claim 19, wherein said inner tube of said valve of said upper telescoping air-tight vent extends telescopingly slidably into said outer tube of said valve of said upper telescoping air-tight vent;

wherein said inner tube of said valve of said upper telescoping air-tight vent has a bore; and wherein said bore in said inner tube of said valve of said upper telescoping air-tight vent matches said bore in said outer tube of said valve of said upper telescoping air-tight vent.

21. The window of claim 16, wherein said inner tube of said valve of said upper telescoping air-tight vent has a closed working end.

22. The window of claim 21, wherein said closed working end of said inner tube of said valve of said upper telescoping air-tight vent has a knob attached thereto so by simply turning said knob on said closed working end of said inner tube of said valve of said upper telescoping air-tight vent a ½ turn, said bore in said inner tube of said valve of said upper telescoping air-tight vent becomes misaligned with said bore in said outer tube of said valve of said upper telescoping air-tight vent thereby shutting off air flow through said upper telescoping air-tight vent.

23. The window of claim 16, wherein said inner tube of said valve of said upper telescoping air-tight vent is covered with insulation.

24. The window of claim 14, wherein said lower telescoping air-tight vent comprises a valve; and
    wherein said valve of said lower telescoping air-tight vent selectively communicates said vent cover of said lower telescoping air-tight vent with either said space or said door of said lower telescoping air-tight vent for determining atmospheric flow direction.

25. The window of claim 24, wherein said valve of said lower telescoping air-tight vent comprises:
    a) an outer tube; and
    b) an inner tube.

26. The window of claim 25, wherein said outer tube of said valve of said lower telescoping air-tight vent extends inwardly into said foot jamb of said frame communicatingly from said vent cover of said lower telescoping air-tight vent to said space.

27. The window of claim 25, wherein said outer tube of said valve of said lower telescoping air-tight vent and said inner tube of said valve of said lower telescoping air-tight vent are made of plastic.

28. The window of claim 25, wherein said outer tube of said valve of said lower telescoping air-tight vent has a bore therein;
    wherein said bore in said outer tube of said valve of said lower telescoping air-tight vent is at a top of said outer tube of said valve of said lower telescoping air-tight vent; and
    wherein said bore in said outer tube of said valve of said lower telescoping air-tight vent selectively communicates said outer tube of said valve of said lower telescoping air-tight vent with said space.

29. The window of claim 28, wherein said inner tube of said valve of said lower telescoping air-tight vent extends telescopingly slidably into said outer tube of said valve of said lower telescoping air-tight vent; and
    wherein said inner tube of said valve of said lower telescoping air-tight vent selectively closes said bore in said outer tube of said valve of said lower telescoping airtight vent.

30. The window of claim 25, wherein said inner tube of said valve of said lower telescoping air-tight vent has a closed working end.

31. The window of claim 25, wherein said inner tube of said valve of said lower telescoping air-tight vent is covered with insulation.

32. The window of claim 13, further comprising a heat-pump hot-water heater;
    wherein said heat-pump hot-water heater is disposed above said door of said upper telescoping air-tight vent; and
    wherein sunlight heat exiting said door of said upper telescoping air-tight vent is ingested by said heat-pump hot-water heater and thereby converted to hot water heating to thereby reduce hot water heating costs by 75% and provide free cooling and dehumidification as a byproduct thereof to thereby further reduce energy costs and fossil fuel use.

33. The window of claim 1, wherein said heat sink is accessed to convert between said extended position thereof and said retracted position thereof by pivotally opening said inner pane.

* * * * *